(12) United States Patent
Hsuan et al.

(10) Patent No.: US 8,139,535 B2
(45) Date of Patent: Mar. 20, 2012

(54) BLIND CHANNEL DETECTION TECHNIQUES

(75) Inventors: Yi Hsuan, Sunnyvale, CA (US); Ping Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 12/381,610

(22) Filed: Mar. 13, 2009

(65) Prior Publication Data

US 2010/0113043 A1 May 6, 2010

Related U.S. Application Data

(60) Provisional application No. 61/110,544, filed on Oct. 31, 2008.

(51) Int. Cl.
*H04W 4/00* (2009.01)

(52) U.S. Cl. ......... 370/329; 370/330; 370/432; 455/450

(58) Field of Classification Search ............... 455/450; 370/329, 341, 432–437, 330
See application file for complete search history.

(56) References Cited

U.S. PATENT DOCUMENTS

| | | | |
|---|---|---|---|
| 7,421,261 B2* | 9/2008 | Sahlin et al. ................. | 455/135 |
| 2007/0201399 A1* | 8/2007 | Lee et al. ..................... | 370/329 |
| 2007/0286066 A1* | 12/2007 | Zhang et al. ................. | 370/208 |
| 2008/0062904 A1* | 3/2008 | Tzu-Ming ..................... | 370/312 |
| 2009/0109931 A1* | 4/2009 | Yin ............................... | 370/335 |
| 2009/0257406 A1* | 10/2009 | Sankar et al. ................. | 370/336 |
| 2010/0046413 A1* | 2/2010 | Jin et al. ....................... | 370/315 |
| 2010/0113047 A1* | 5/2010 | Kim et al. ..................... | 455/450 |
| 2010/0208710 A1* | 8/2010 | Kwak et al. ................... | 370/336 |
| 2010/0290418 A1* | 11/2010 | Nishio et al. ................. | 370/329 |
| 2010/0290419 A1* | 11/2010 | Wengerter ..................... | 370/329 |
| 2011/0032900 A1* | 2/2011 | Maheshwari et al. ........ | 370/329 |

OTHER PUBLICATIONS

Love et al., "Downlink Control Channel Design for 3GPP LTE ", IEEE Wireless Communications and Networking Conference, 2008, Mar. 31-Apr. 3, 2008, pp. 813-818.

* cited by examiner

*Primary Examiner* — Kent Chang
*Assistant Examiner* — Magdi Elhag
(74) *Attorney, Agent, or Firm* — Glen B. Choi

(57) ABSTRACT

Techniques for use in a blind detection process of information elements. Channels can be allocated into groups. For each group, resource blocks of each channel can be further divided into subspaces. A base station may communicate a number of channels in a group, a number of subspaces allocated to a group of channels, and a bit shift value to all mobile stations via non-specific user channels to a mobile station. The mobile station uses a blind detection scheme and the number of channels allocated per group, a number of sub-spaces per group of channels, and a bit shift value to locate an information element assigned to the mobile station. A number of blind detection trials may be capped to a sum of a number of channels for all allocated groups.

14 Claims, 3 Drawing Sheets

BLIND CHANNEL DETECTION TECHNIQUES

RELATED APPLICATION

This application is related to U.S. provisional application Ser. No. 61/110,544, filed Oct. 31, 2008, and claims priority to that date for all applicable subject matter.

FIELD

The subject matter disclosed herein relates generally to techniques to decode downlink control channels.

RELATED ART

In wireless networks, a base station transmits resource allocation information over control channels to mobile stations. For example, resource allocation information can convey, for example, an individual data channel location, modulation-coding scheme (MCS), or size of data channels, to allow the mobile station to decode allocation channels. Some systems require explicitly signaled detection or blind detection to detect resource allocation channel.

Explicitly signaled detection specifies exactly where the control channel is located and only one (1) detection trial is needed. However explicit signaling is not desirable because it requires significant amount of resources to transmit extra control information. For blind detection, the mobile station would need multiple detection trials for each MCS level to find its control channels. Accordingly, blind detection requires higher detection complexity at the mobile station side than that of explicitly signaled detection.

The well known 3GPP Long Term Evolution (LTE) blind detection scheme divides the entire search space into sub search spaces. LTE blind detection also requires a fixed number of detection trials, which is a waste if only a small number of channels are present. In addition, the location of each subspace is random with the entire search space, causing large resource waste and scheduling delay.

It is desirable to lessen the bandwidth used and number of trials for blind detection schemes.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1A:
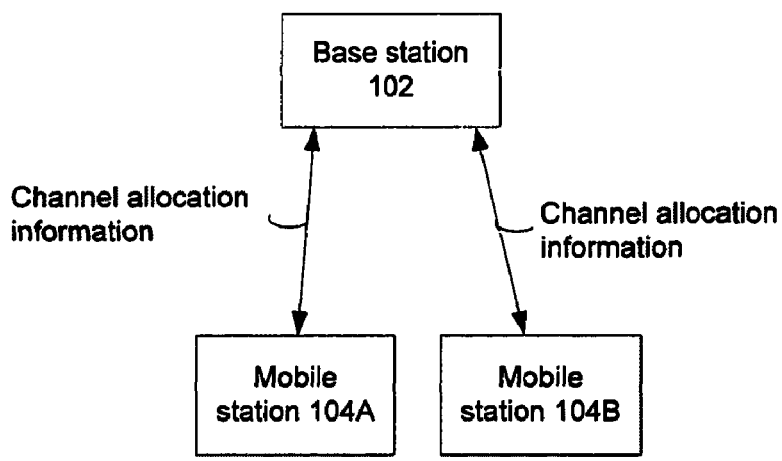
FIG. 1A depicts a system having a base station that communicates with a mobile station, in accordance with an embodiment.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11h, 802.11i, and 802.11n.

In some embodiments, channels are allocated into groups such that all channels in a group use the same modulation-coding scheme (MCS) and each group is associated with a unique MCS. In each group, channels can be further divided into smaller subspaces. When blind detection is applied to determine information elements from resource blocks, only one subspace in a group may be searched and a maximum of number of blind detection trials is capped. By comparison, some embodiments provide much less resource waste and scheduling delay than that of LTE.

FIG. 1A depicts a system 100 having base station 102 and mobile stations 104A and 104B. In various embodiments, base station 102 transmits at least channel allocation information as non-specific user information to mobile stations 104A and 104B. Section 11.7.2.3.1.1 of IEEE 802.16 (2008) describes non-user specific channels. The channel allocation information can include, for example, a number of channels in a group, the size of a subspace, and a bit shift value. A particular mobile station can use the channel allocation information in blind detection trials to determine information elements. Use of the number of channels per group simplifies blind detection trials because the mobile station does not need to try the entire search space for all possible MCS levels. In various embodiments, the total number of detection trials is no more than the sum of number of channels for all allocated groups.

Information elements may include resource allocation information for user-specific traffic in both uplink and/or downlink directions. For example, information elements may also store MCS type, power boosting amount, HARQ related information, and/or MIMO related information. The information is separately coded among different users and different connection IDs (CIDs). Depending on the amount of information and modulation-coding scheme (MCS), each user-specific allocation channel can take a certain number of resource blocks/units.

Figure 1B:
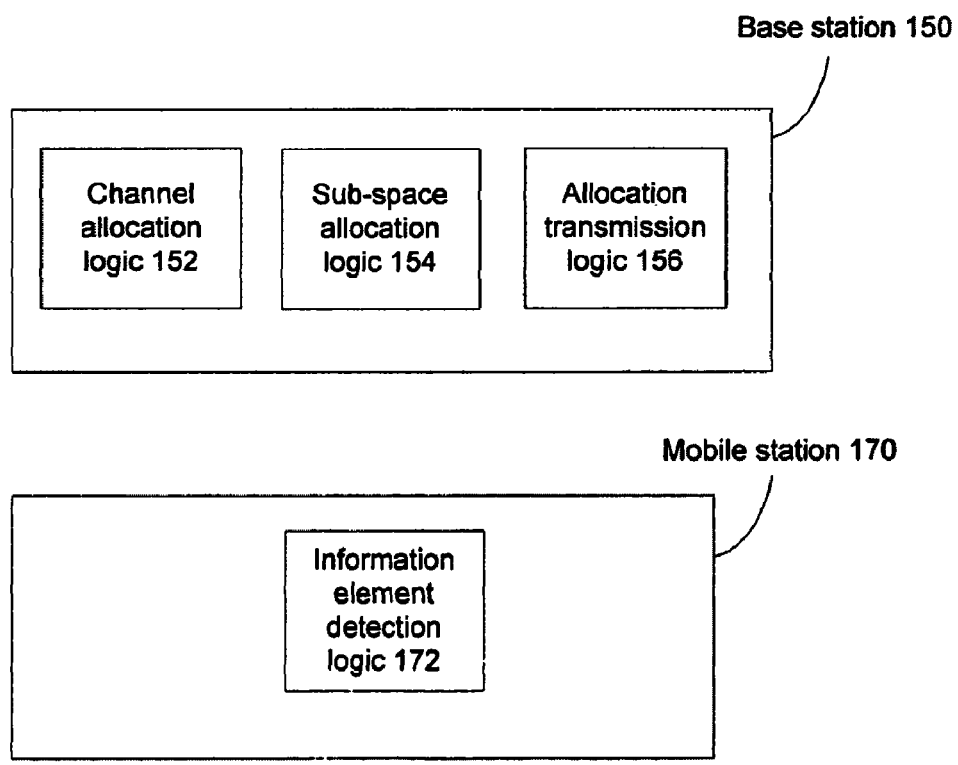
FIG. 1B depicts an example of logic that can be used to transmit information used in blind detection trials, in accordance with an embodiment.

FIG. 1B depicts an example of logic in a base station and mobile station that can be used to transmit information useful to reduce a number of blind detection trials to detect information elements transmitted to a mobile station, in accordance with an embodiment. A base station 150 may include channel allocation logic 152, sub-space allocation logic 154, and allocation transmission logic 156. Channel allocation logic 152 may allocate channels to groups in the manner described with regard to FIG. 2. Sub-space allocation logic 154 may allocate a group of channels to subspaces. Allocation transmission logic 156 may transmit the channel allocations among groups, subspace divisions per group, and bit shift values to mobile station 170 via non-specific user channels.

Mobile station 170 may include information element detection logic 172. Information element detection logic 172 may use blind detection trials to determine information elements transmitted to mobile station 170 based in part on the received channel allocations among groups, subspace divisions per group, and bit shift values.

Figure 2:
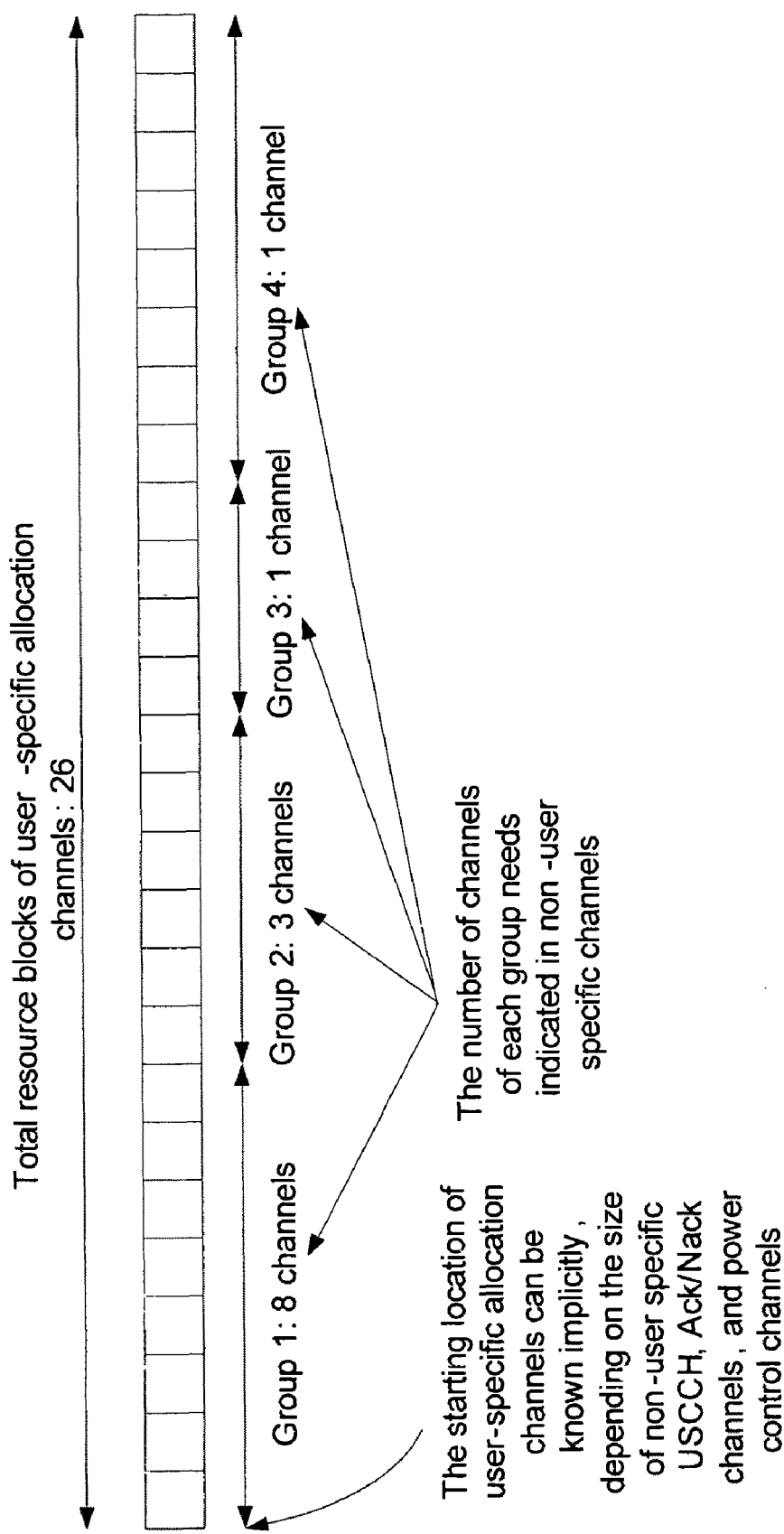
FIG. 2 depicts an example of channel allocation, in accordance with an embodiment.

FIG. 2 depicts an example of channel allocations among four groups, in accordance with an embodiment. In this example, a base station assigns resources to allocation channels in the order of groups 1, 2, 3, and 4. Resource assignment may take place in other orders. In this example, group 1 has one (1) resource block per channel, group 2 has two (2) resource blocks per channel, group 3 has four (4) resource blocks per channel, and group 4 has eight (8) resource blocks per channel. In this example, the total number of resource blocks used for user-specific allocated channels is twenty six (26). A base station transmits an indication of numbers of allocation channels in each group to mobile stations using non-specific user information (i.e., eight (8) channels for group 1, three (3) channels for group 2, one (1) channel for group 3, and one (1) channel for group 4).

The base station can transmit the number of channels for the four groups to the mobile station in a 16 bit value. For example, bits B0-B3 may indicate a number of channels in group 1, bits B4-B7 may indicate a number of channels in group 2, bits B8-B11 may indicate a number of channels in group 3, and bits B12-B15 may indicate a number of channels in group 4.

The mobile station may determine the boundaries of each group by determining the number of resource blocks per group. The exact size of each group can be determined as the number of channels in a group times the number of resource blocks per channel. The number of resource blocks per channel can be a fixed value.

Based on knowledge of the allocation channels in each group, a mobile station may attempt to blind-detect its allocation channels in each group. By knowing the numbers of allocation channels in each group, a mobile station may not need to try the entire search space for all possible MCS levels. The total number of possible detection trials is the sum of number of channels in each group, which is thirteen (13) in this example (assuming one MAP IE type). After a mobile station decodes the non-user specific information, the mobile station knows the number of channels in each group, then tries to decode each channel in a first group, then tries to decode each channel in the next group, and so forth.

The number of blind detection trials depends on the number of channels, not the number of resource blocks per channel. The detection complexity increases linearly as the number of channels in each group increases. In various embodiments, to cap the detection complexity, each group can be further divided into one or more subspaces and a mobile station may only detect one subspace in order to determine allocated channels. Therefore, the number of detection trials may not exceed the sum of subspace sizes for all groups.

Figure 3:
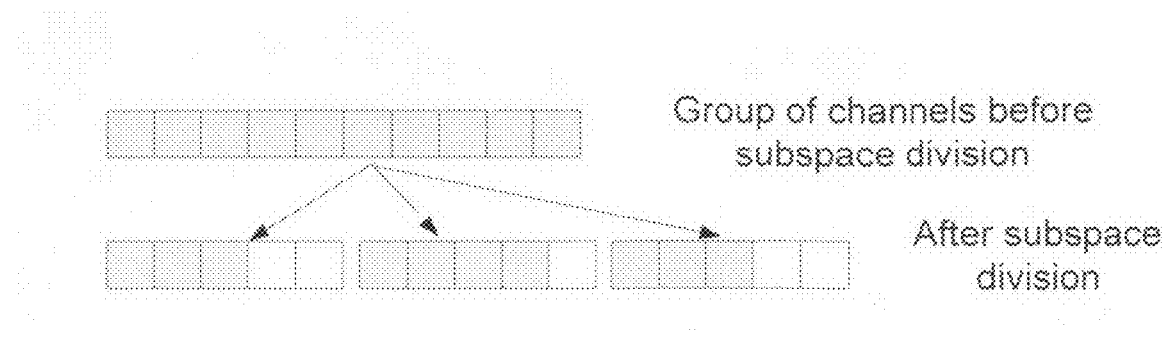
FIG. 3 depicts an example of subspace allocation, in accordance with an embodiment.

FIG. 3 depicts a manner of allocating a group of channels to subspaces, in accordance with an embodiment. In this example, ten channels are to be allocated to subspaces and one resource unit is allocated for each information element. In particular, FIG. 3 shows how channels in a group are divided into three subgroups.

Each channel uses a number of resource blocks depending on the MCS. For an MCS used by a channel, a channel would take "x" resource blocks. Because all channels in a group use the same MCS, the minimum resource blocks required by the group is x times y, where y is the number of channels in the group. In the example shown in FIG. 3, x=1 and y=10.

A base station may communicate to a mobile station a number of channels in a group, the size of a subspace, and a bit shift value to all mobile stations via non-specific user channels. A number of resource blocks per channel is implied by the MCS of that group. A mobile station identifies the subspace that contains its information element by calculating mod(CID>>b, s), where b is a bit shift value and s is a number of subspaces for the group.

As will be described in more detail later, in various embodiments, for a particular bit shift value b, the total number of detection trials by a mobile station is no more than the sum of the maximum number of resource blocks in subspaces for all groups regardless of the number of allocation channels in the downlink control region.

In this example, the second subspace has the mobile station's information element (IE). Accordingly, the mobile station tries to decode the first resource unit in the second subspace and checks if the CID contained in the decoded resource unit matches its own. The mobile station decodes each resource unit in the second subspace but does not decode any resource block in the first and third subspaces. Thus, by allocating a subspace to a mobile station based on a connection ID, the mobile station has to search resource units in only one subspace per group because the mobile station has a unique connection ID. Accordingly, the mobile station potentially reduces blind detection trials as well as associated decoding activity, processing resources, and latency.

Figure 4:
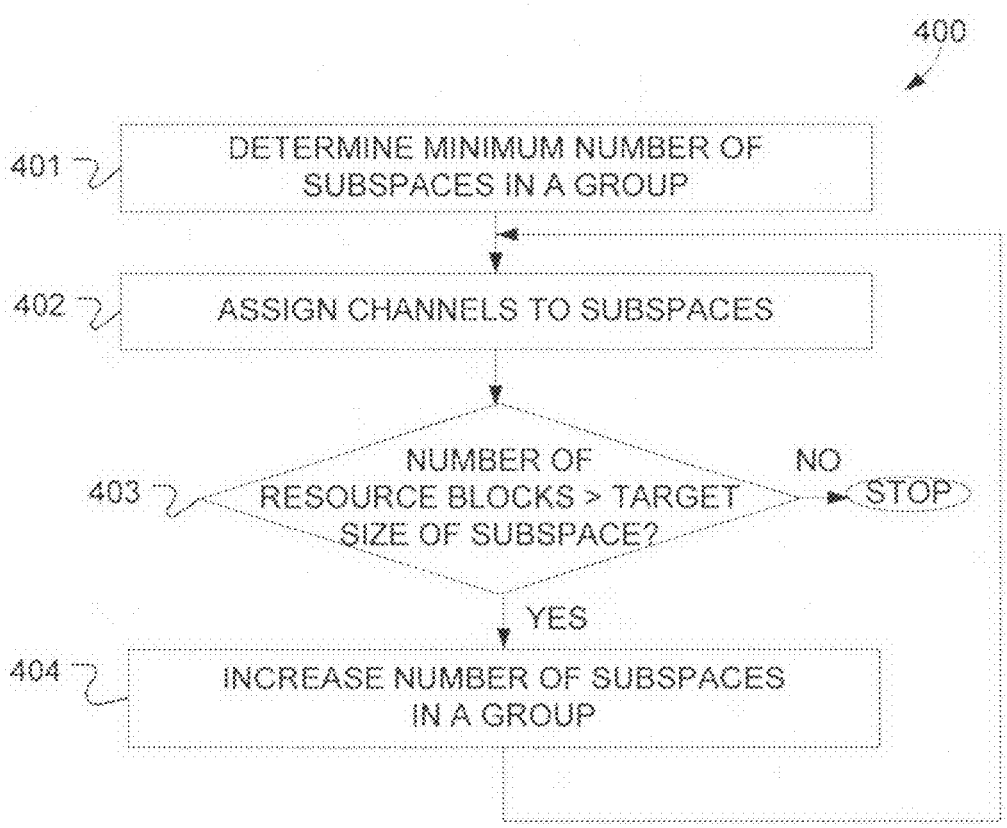
FIG. 4 depicts a process that can be used to assign resource blocks to subspaces, in accordance with an embodiment.

FIG. 4 depicts a process that can be used to assign resource blocks to subspaces, in accordance with an embodiment. For example, a base station may use process 400 to allocate a group of channels to subspaces. Block 401 may include determining a minimum number of subspaces for channels allocated to a group. For example, block 401 may include determining a minimum number of sub search spaces in group i, denoted by s(i), as ceil(n(i)/p(i)), where n(i) is the total number of channels in group i and p(i) is the maximum number of channels in a subspace of group i. A minimum number of subspaces, s(i), allocated to a group i may be determined by rounding up the integer of n(i)/p(i).

Block 402 may include assigning channels into a subspace based on the connection ID of the recipient mobile station. For example, block 402 may include assigning a channel in group i into sub space (i, j) if mod(CID>>b, s(i))=j, where b is a bit shift amount. In other words, block 402 may include shifting a CID by b bits, dividing the shifted CID by a minimum number of subspaces for the group (s(i)), and then using the remainder as the assigned subspace number for the channel.

Shifting a CID by bit number b prior to assigning a CID to a subspace may distribute mobile stations among all available subspaces. By contrast, dividing a search space into subspaces solely based on CID may cause resource waste because CIDs are random and channels cannot be uniformly distributed into subspaces. For example, if all CIDS are even numbered and s(i)=2, then all mobile stations may be assigned the same subspace and no mobile station is assigned to other subspaces.

The following describes a manner to make a determination of the bit number b that yields the smallest number of resource blocks. The total number of resource blocks used for a particular bit shift value b can be represented as:

$$\operatorname*{argmin}_{b}\left(\sum_{i} s(i, b) \cdot p(i)\right)$$

where s(i,b) is the number of subspaces for group i given a bit shift value b. In various embodiments, for a particular bit shift value b, the total number of detection trials by a mobile station is no more than the summation of p(i) over all i (where i represents a group) regardless of the number of allocation channels in the downlink control region.

Block 403 may include determining whether a number of channels in a subspace is greater than a maximum number of channels in a subspace of a group. For example, block 403 may include determining if n(i,j,b)>p(i) for any j and incrementing s(i), the subspace number for group i. Adding users to the same subspace increases a number of resource blocks in a subspace. If the number of channels in a subspace is greater than a maximum number of channels in a subspace of group (p(i)), then block 404 increases the number of subspaces for a group by one more (or more than one) subspace per group. Block 402 may follow block 404 in order to assign channels to the revised number of subspaces.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method performed at a mobile station, the method comprising:
    receiving a connection identifier value associated with the mobile station;
    receiving, via non user-specific channels, a channel allocation information comprising number of channels allocated to a group of channels, number of sub-spaces for the allocated group of channels, and a bit shift value;
    receiving a transmission including at least one group of channels, each group of channels allocated among one or more sub-spaces, and each sub-space including one or more resource blocks; and
    for each group:
    identifying a sub-space of the group associated with the mobile station based in part on the connection identifier and determining whether a resource block in the identified sub-space includes a portion of control channel information for the mobile station, wherein for all groups, a total number of times determining whether a resource block in the identified sub-space includes a portion of control channel information for the mobile station does not exceed a sum of a maximum number of resource blocks in sub-spaces for all groups.

2. The method of claim 1, wherein the identifying a sub-space is based in part on the connection identifier value, the number of channels in each group, number of sub-spaces for a group, and a bit shift value.

3. The method of claim 1, wherein the identifying a sub-space comprises:
    bit-shifting the connection identifier value using the bit shift value;
    dividing the shifted connection identifier value by the number of sub-spaces for the group; and
    using a remainder from the dividing to identify a sub-space for the group.

4. The method of claim 1, wherein the bit shift value is to minimize a number of resource blocks associated with a sub-space.

5. The method of claim 1, wherein channels in the same group are coded with the same modulation-coding scheme.

6. The method of claim 1, further comprising:
requesting to access a resource block in the sub-space that includes a portion of at least one information element for the mobile station.

7. A computer-implemented method performed at a base station, the method comprising:
requesting allocation of one or more channels associated with a mobile station to at least one group;
requesting allocation of the one or more channels of at least one group into sub-spaces;
requesting transmission to the mobile station of at least a connection identifier value for the mobile station;
requesting transmission to the mobile station via at least one non-specific user channel of at least one of: a number of channels per group, a number of sub-space divisions per group, and a bit shift value;
requesting transmission of the one or more channels to the mobile station, wherein the allocation of the one or more channels of at least one group into sub-spaces comprises:
bit-shifting the connection identifier value using the bit shift value;
dividing the shifted connection identifier value by the number of sub-spaces for the group; and
using a remainder of the dividing to allocate at least one group into a sub-space.

8. A mobile station comprising:
at least one antenna communicatively coupled to a processor, the processor configured to:
recognize a connection identifier value associated with the mobile station;
recognize number of channels allocated to a group of channels, number of sub-spaces for the allocated group of channels, and a bit shift value, wherein said number of channels, said number of sub-spaces and said bit shift value are included in a channel allocation information received via non user-specific channels;
recognize a transmission including at least one group of channels, each group of channels allocated among one or more sub-spaces, and each sub-space including one or more resource blocks; and
for each group:
locate a sub-space of the group associated with the mobile station based in part on the connection identifier and determine whether a resource block in the located sub-space includes a portion of control channel information for the mobile station, wherein for all groups, a total number of times to determine whether a resource block in the identified sub-space includes a portion of control channel information for the mobile station does not exceed a sum of a maximum number of resource blocks in sub-spaces for all groups.

9. The mobile station of claim 8, wherein to locate a sub-space, the processor is to identify a sub-space based in part on the connection identifier, the number of channels in each group, sub-space divisions per group, and the bit shift value.

10. The mobile station of claim 8, wherein to locate a sub-space, the processor is to:
bit-shift the connection identifier value using the bit shift value;
divide the shifted connection identifier value by the number of sub-spaces for the group; and
use a remainder of the division to locate a sub-space for a group.

11. The mobile station of claim 8, wherein the bit shift value is to minimize a number of resource blocks in a sub-space.

12. The mobile station of claim 8, wherein channels in the same group use the same modulation-coding scheme.

13. The mobile station of claim 8, wherein the processor is also to:
access a resource block in the sub-space that includes a portion of at least one information element for the mobile station.

14. A base station comprising:
at least one antenna communicatively coupled to a processor, the processor configured to:
request allocation of one or more channels associated with a mobile station to at least one group;
request allocation of the one or more channels of at least one group into sub-spaces;
request transmission to the mobile station of a connection identifier for the mobile station;
request transmission to the mobile station via of at least one non-specific user channel at least one of: a number of channels per group, a number of sub-space divisions per group, and a bit shift value;
request transmission of the one or more channels to the mobile station,
wherein the allocation of the one or more channels of at least one group into sub-spaces comprises:
bit-shifting the connection identifier value using the bit shift value;
dividing the shifted connection identifier value by the number of sub-space divisions for the group; and
using a remainder of the dividing to allocate at least one group into a sub-space.

* * * * *